Figure 1:
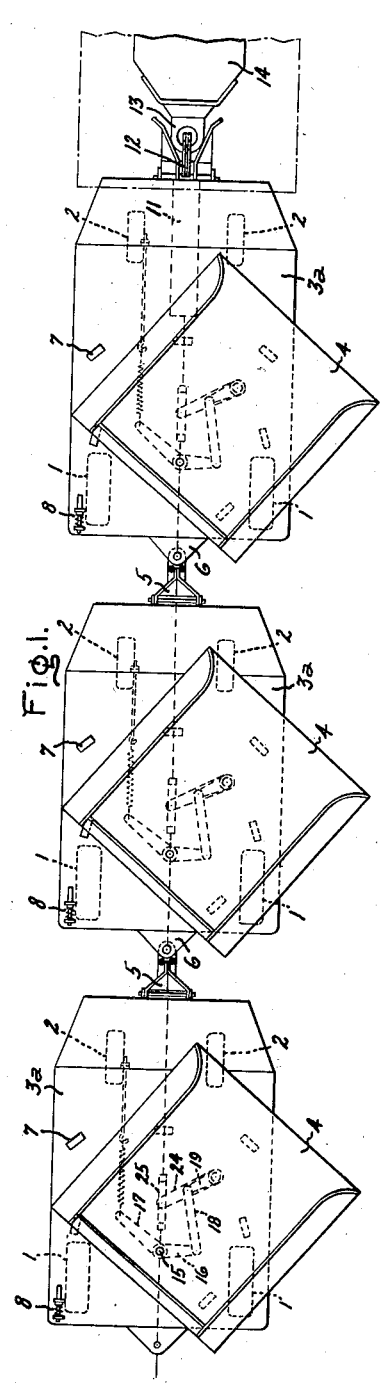

Jan. 9, 1940.  W. G. UHLIR  2,186,848
TRAILER TRUCK
Filed Sept. 23, 1938  3 Sheets-Sheet 1

Inventor:
William G. Uhlir,
by Harry E. Dunham
His Attorney.

Jan. 9, 1940.  W. G. UHLIR  2,186,848
TRAILER TRUCK
Filed Sept. 23, 1938  3 Sheets-Sheet 2
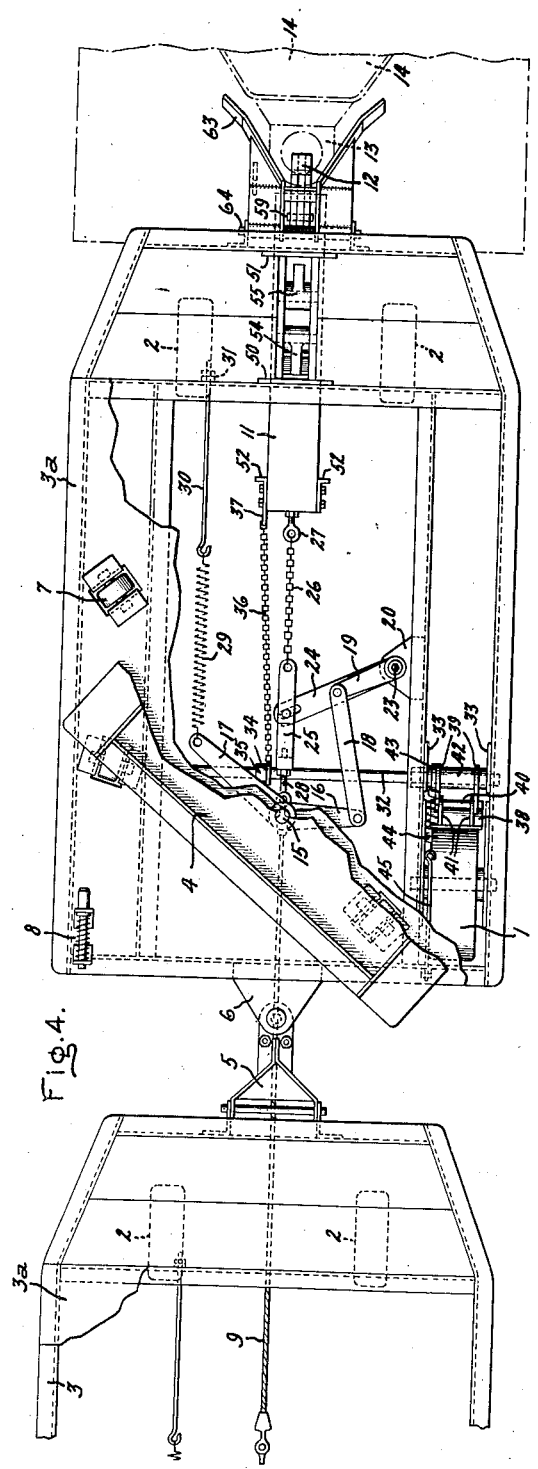
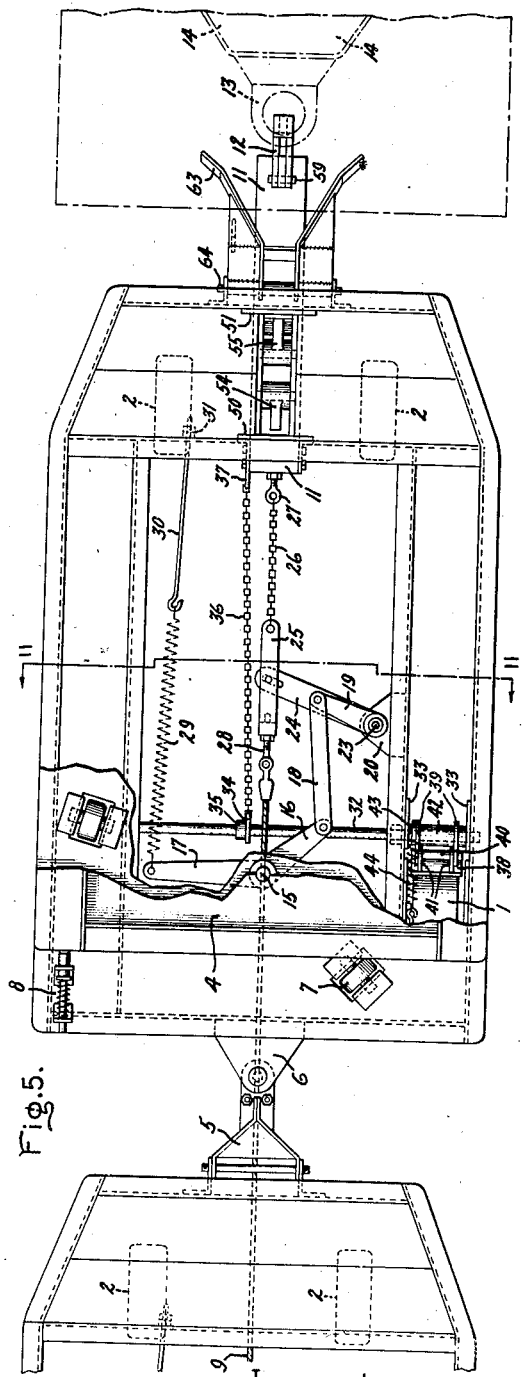
Inventor:
William G. Uhlir,
by Harry E. Dunham
His Attorney.

Jan. 9, 1940.  W. G. UHLIR  2,186,848
TRAILER TRUCK
Filed Sept. 23, 1938   3 Sheets-Sheet 3
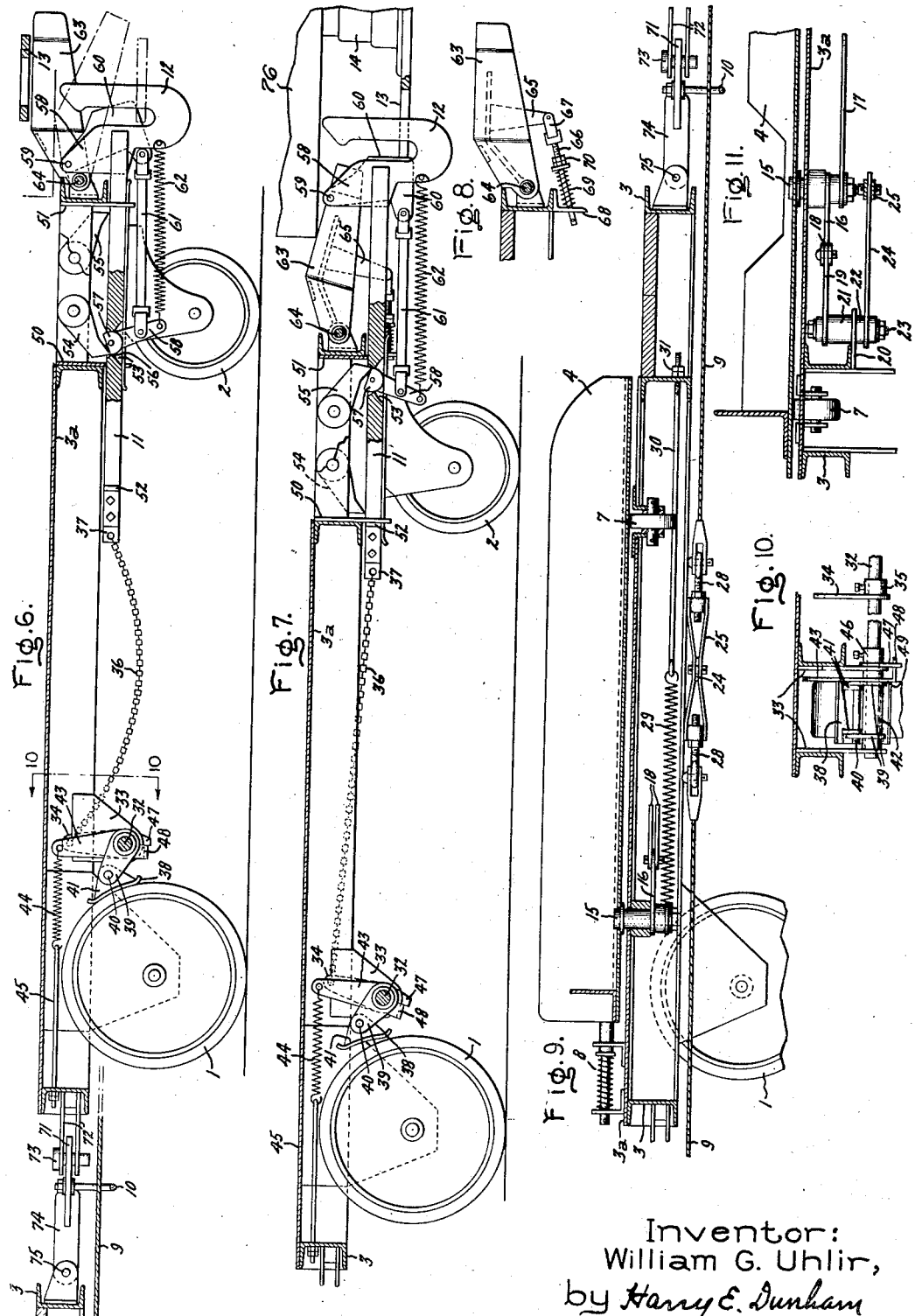
Inventor:
William G. Uhlir,
by Harry E. Dunham
His Attorney.

Patented Jan. 9, 1940

2,186,848

UNITED STATES PATENT OFFICE 2,186,848

TRAILER TRUCK

William G. Uhlir, Westchester, Ill., assignor to Edison General Electric Appliance Company, Inc., Chicago, Ill., a corporation of New York Application September 23, 1938, Serial No. 231,392

22 Claims. (Cl. 280—33.2)

This invention relates to trailer trucks, and more particularly to a train of trailer trucks adapted for use in factories, warehouses, and the like.

The essential consideration in trucks of this type is to provide trucks which can be readily loaded and unloaded but which at the same time permit fullest use of the floor space available by requiring the minimum amount of space for aisles. An additional consideration is to so arrange the operating mechanism of such trailer trains that it can be readily controlled by one person so that a saving in time and labor can be effected.

It is an object of this invention to provide a trailer truck train which can be readily controlled by one person and which will effect a saving in floor space by requiring less space for aisles.

It is a further object of this invention to provide a trailer truck which has a top platform which is adapted to rotate with respect to the remainder of the truck so as to facilitate loading and unloading of the truck. More specifically it is an object of this invention to provide a trailer truck with a platform which is adapted to rotate or swivel between an open, or loading and unloading, position and a closed, or towing, position.

It is a further object of this invention to provide a trailer truck with a swiveling top which has self-energizing brakes adapted to set when the rotatable platform is in its open, or loading and unloading, position.

It is an additional object of this invention to provide a trailer truck having automatic means for rotating the movable platform and actuating the brake mechanism. More specifically it is an object of this invention to provide a drawbar on the trailer truck which is arranged to translate to a limited extent with respect to the trailer truck, which limited translation is utilized to operate in sequential manner the mechanism for rotating said platform and actuating said brakes.

It is an additional object of this invention to provide means on the drawbar whereby after limited translation thereof in the direction of travel of the truck the towing force may be transmitted directly to the frame of the trailer truck during towing operations.

It is an additional object of this invention to provide means for locking the movable platform in either its loading and unloading position or its towing position.

It is a further object of this invention to provide automatic mechanism for releasing the locking device for said movable platform. More specifically it is an object of this invention to provide a trigger releasing mechanism for the locking device which is actuated by the mutual engagement of the parts of the towing coupling.

It is an additional object of this invention to provide a train of trailer trucks having movable platforms all of which are moved in unison and movement of which is controlled by mechanism associated with the first truck of said train.

Further objects and advantages of my invention will become apparent as the following description proceeds, and the features of novelty which characterize my invention will be pointed out with particularity in the claims annexed to and forming a part of this specification.

Figure 2:
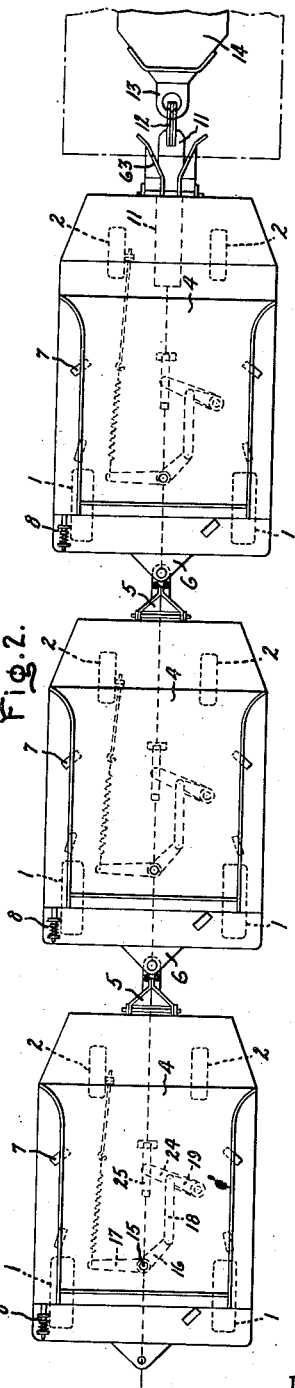
Figure 3:
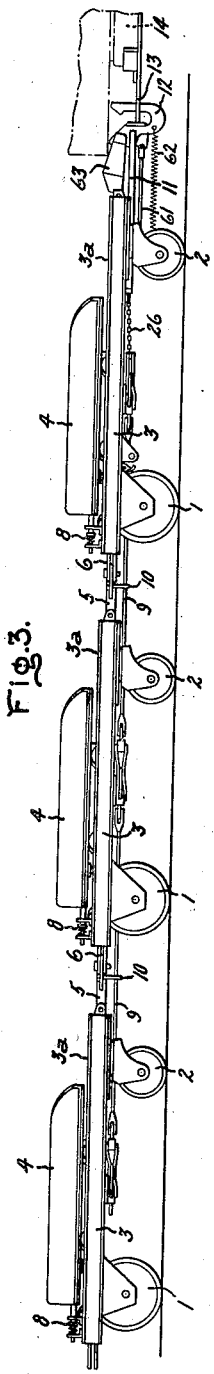

For a fuller understanding of my invention, reference should be had to the accompanying drawings, in which Fig. 1 represents a plan view of my improved trailer truck train in the loading and unloading position; Fig. 2 is a view of the trailer truck train in the towing position; Fig. 3 is a side elevation of the trailer truck train shown in Fig. 2; Fig. 4 is a plan view having a portion thereof broken away showing the position of the parts in the unloading and loading position of the truck; Fig. 5 is a plan view partially broken away showing the position of the parts during towing; Fig. 6 is a side elevation partly in section showing details of the brake and locking mechanisms and the coupling guide when the movable platform is in the loading and unloading position; Fig. 7 is a similar view of the parts shown in Fig. 6 when the movable platform is in the towing position; Fig. 8 is a detail elevation of the coupling guide; Fig. 9 is a side elevation partially in section of a typical trailer truck car other than the first car of a train; Fig. 10 is a partial section taken in the line 10—10 of Fig. 6 showing details of the brake mechanism; and Fig. 11 is a partial section taken on the line 11—11 of Fig. 5 showing details of the rotating or swiveling mechanism.

In the drawings, like parts will be designated by the same numeral. Referring to Figs. 1, 2, and 3 of the drawings, it will be observed that a trailer train comprising three cars, each having main wheels 1—1 and swivel casters 2—2, is shown. On each set of wheels and casters is mounted a truck frame 3, provided with a subplatform plate 3a. Pivotally supported by truck frame 3 through fixed platform 3a is a swivel top plate or platform 4 which is adapted to be swiveled or rotated through an angle of 40° by mechanism which will be more fully described hereinafter. The trailer trucks in the train are connected together by suitable coupling devices 5, 6.

Mounted in the fixed platform plate 3a, which is supported by the truck frame 3, are suitable ball bearing turn-table rollers 7 having portions thereof extending above the plate 3a. The under surface of movable platform 4 is adapted to engage the surface of the rollers 7 extending above the plate 3a in such a manner that the rollers facilitate the rotating or swiveling of the platform 4. Also mounted on each truck frame is a resilient buffer member 8 which is adapted to check the swiveling motion of the truck platform 4 during closing thereof.

The first truck of the trailer train is provided with a drawbar 11 which is arranged to translate to a limited extent with respect to the truck frame, as will be more fully described below. The drawbar 11 is connected through a towing hook 12 to the towing eye 13 of a suitable power device such as a high lift electric industrial truck indicated in part at 14. Extending between each truck of the trailer train is a cable 9 which passes through suitable cable guides 10. The purpose of this cable is to actuate the swiveling mechanism in response to changes in position of the drawbar of the train, as will be more fully described below.

Referring to Figs. 4, 5, and 11, it will be observed that the movable platform 4 is supported by the truck frame 3 through a king-pin 15 which is pivotally journaled in fixed platform 3a. Attached to this king-pin are a main lever 16 and a spring lever 17. Main lever 16 is connected through a pair of connecting links 18 to an auxiliary lever 19. Rigidly secured to the truck frame 3, by welding or other suitable means, is bracket 20. Welded to the bracket are spacer sleeves 21 and 22 (Fig. 11) in which is suitably journaled pin 23. Auxiliary lever 19 is attached to the upper end of pin 23. Attached to the opposite end of pin 23 is operating lever 24 which is suitably coupled to the connecting yoke 25. It will be understood that the connecting yoke 25 is adapted to float freely with respect to the frame 3 of the trailer truck.

In the first truck of the trailer train, the forward end of the connecting yoke 25 is connected by a chain 26 to an eye 27 provided on the drawbar 11. The opposite end of yoke 25 is connected through an adjustable eye-bolt 28 to the cable 9 extending back to the connecting yoke of the next succeeding truck. In the remaining trucks both ends of the connecting yoke 25 are connected through adjustable eye-bolts to the cable 9 extending rearward from the first truck.

The spring lever 17 has its free end connected to spring 29 the opposite end of which is attached through hook 30 to the truck frame 3. The spring 29 is adapted to bias the platform 4 to its open, or loading and unloading, position. Suitable adjusting means 31 are provided at the end of rod 30 for adjusting the tension of spring 29.

Extending across the truck frame of the first truck of the trailer train in advance of the main truck wheels 1, is a brake shaft 32 supported on each end by pairs of spaced flange plates 33. Adjustably mounted on shaft 32 is an operating lever 34 having an integral collar and set-screw assembly 35 (Fig. 10) for adjusting the lever relative to the shaft 32. The lever 34 is connected through chain 36 to a suitable connecting plate 37 mounted on one side of drawbar 11.

Each of the main wheels of the first truck is provided with a brake shoe 38, as shown in Figs. 6, 7, and 10. The brake shoe 38 is pivotally connected to the brake shaft 32 in any suitable manner. In the arrangement shown, a lever assembly is employed which comprises a pair of levers 39 attached by means of pin 40 to a pair of flanges 41 provided on the shoe 38. The opposite ends of levers 39 are welded to sleeves 42 which extend between the pair of flanges 33. Included in the brake lever assembly is lever 43 the upper end of which is connected through brake spring 44 and adjustable rod 45 to the main frame 3. The brake spring 44 is adapted to bias the brake shoe 38 to its braking position. Adjustably attached to the brake shaft 32 by means of a collar and set screw assembly 46 is a releasing lever 47 which is adapted to engage a horizontally extending abutment 48 provided on the lower end portion 49 of lever 43 of the brake lever assembly. The operation of this self-energizing brake will be more fully described hereinafter.

Referring now to Figs. 6, 7, and 8, the details of the drawbar and coupling guide assembly will be described. The drawbar 11 is adapted to slide freely through guide plates 50 and 51 provided on the truck frame 3. Stops 52 are provided on the drawbar to limit its forward motion. These stops engage the member 50 attached to the frame and serve to transmit the towing force directly from the drawbar to the frame after the drawbar has moved freely through a predetermined distance. The rearward motion of the drawbar is limited by the abutment of the rear face of towing hook 12 on a portion of the coupling assembly, as shown in Fig. 6.

In the drawbar, intermediate its ends, is provided a slot 53 which is adapted to be engaged by locking pawls 54 and 55. The width of the slot 53 varies throughout the depth thereof so that projecting faces 56 are provided within the slot. Arranged between these projecting faces 56 and pivotally mounted within the slot is a pawl releasing dog 57 which is connected to a lever 58. The pawl releasing dog is of such size that it bears upon the surface of the projecting faces within the slot. As will be readily understood, the locking pawls are provided to lock the drawbar in either the releasing position corresponding to the position when the towing hook abuts against a portion of the coupling guide assembly or the towing position corresponding to the position when the stops 52 abut against plate 50. The releasing dog 57 is provided to release the locking pawls when it is desired to change from one position to the other.

The releasing dog 57 is arranged to be automatically operated in accordance with the positive engagement of the towing eye 13 of the power unit with the towing hook 12 at the end of drawbar 11. The arrangement for accomplishing this comprises the towing hook 12 which is provided with a bracket portion 58 to which is pivotally attached at 59 a trigger 60. This trigger is arranged so as to obstruct the free passage of the towing eye 13 as it engages the towing hook 12. It is apparent, therefore, that when the towing eye is moved downwardly into the towing hook, the trigger 60 will be pivoted about its pivot point 59. Attached to the trigger member 60 is connecting rod 61 which is attached at its opposite end to the operating lever 58 connected to the pawl releasing dog 57. A spring 62 is connected between the end of the lever 58 and the towing hook 12 in order to bias the pawl releasing dog 57 to such a position that it will allow locking pawl 54 to lock the drawbar in a position corresponding to the loading and unloading position of the movable or swivel platform 4 as illustrated in Fig. 6. It will be seen, therefore, that a locking device is provided for the drawbar which will lock the drawbar at either end of its limited translation with respect to the truck frame, the one end corresponding to the point at which the towing hook abuts against the coupling guide assembly which corresponds to the loading and unloading position of the movable or swivel platform, the other end corresponding to the point at which the stops 52 strike the plate 50 which in turn corresponds to the towing position of the movable or swivel platform. It will also be seen that trigger means are provided for releasing the locking means when the drawbar is in either of its two limiting positions and that the operation of the trigger releasing device is dependent upon the positive engagement of the towing hook and towing eye.

A U-shaped coupling guide 63 is pivotally attached to the front end of the truck frame. The rear face of the towing hook is adapted to abut against the pivot bar 64 to limit the backward movement of the drawbar, as previously explained. A bracket 65 is attached to the coupling guide 63 and suitable means are pivotally connected to this bracket so as to bias the coupling guide to a horizontal position. This means includes a rod 66 having a bifurcated clamp 67 which is adapted to be pivotally connected to bracket 65. This rod 66 is adapted to slide through a bracket 68 provided on the truck frame. A spring 69, held in position by an adjustable washer and nut 70, is adapted to effect the aforementioned biasing of the coupling guide.

In Fig. 9 is shown a vertical section through one of the trailer trucks other than the first truck. These trucks are similar in all respects to the truck described above except that the drawbar and locking device therefor are omitted. In addition, no means are provided for braking these trucks since sufficient braking can be obtained by the braking device attached to the first truck in a train. It is to be understood, however, that although these features are omitted, the trucks of the type shown in Fig. 9 could very readily include them.

In Fig. 9 is also illustrated the preferred embodiment of the coupling devices 5 and 6 by which one truck is coupled to the next preceding truck. This consists of a coupling eye 71 adapted to extend between the split coupling member 72 provided on the next preceding truck. A bolt 73 is adapted to connect the eye 71 and the member 72. The coupling eye 71 is pivotally mounted at 75 through lever 74 to the truck frame 3. Attached to the coupling eye 71 is the cable guide member 10 through which passes the cable 9. As previously described, the cable 9 is attached through adjustable eyebolts 28 to the connecting yoke 25, and the mechanism for rotating the movable platform 4 is connected to and actuated by the yoke 25.

Having described in detail the operating mechanism incorporated in the new and improved trailer train constituting this invention, the operation of this device will next be described. It will be assumed that the trailer train comprises three trucks, as shown in Fig. 1. As previously stated, however, the train may comprise as many trucks as desired. It will be further assumed that a suitable industrial high lift electric truck having a towing eye is used as the power unit. It will also be assumed that the trailer train is unloaded and disconnected from the power unit. In this condition the movable platforms of the trucks in the trailer train will be in the position shown in Fig. 1, and the brakes on the first truck will be in the braking or set position. Furthermore, the drawbar of the first truck in the train will be locked in the position in which the coupling hook abuts against the pivot pin of the coupling guide, as shown in Fig. 6. With the movable platforms in the open position, the high lift power unit may be employed to load the platform in the manner well known in the art. After all of the trucks have been loaded an additional load may also be placed on the platform of the power unit. The power unit will then be brought to the front of the trailer train and the towing eye thereof lined up with the towing hook of the first car of the trailer train. With a load on the power unit the operator would have considerable difficulty in obtaining direct alignment of the towing hook and eye. It is for this reason that the coupling guide 63 is provided. By means of this guide the towing eye will be brought into direct alignment with the towing hook, making it possible for the operator to couple "blind." When the parts are in alignment the towing eye 13 will be lowered into the towing hook 12. As towing eye 13 is lowered, the trip mechanism for the locking pawl will be released; in other words, the trigger 60 will be pivoted in a clockwise direction about its pivot point 59 and the pawl releasing dog 57 will be rotated so as to move the locking pawl 54 out of the slot 53 in the drawbar. When the towing eye has been fully lowered into the towing hook, the load platform of the power unit indicated in part at 76 will come to rest upon the upper surface of the coupling guide, as shown in Fig. 7.

With the trailer train coupled in the manner just described, the power unit may be started forward. The forward motion is first transmitted to the drawbar and the drawbar slides relative to the frame of the first trailer car. This forward motion of the drawbar accomplishes two results. It first actuates the operating mechanism so as to rotate or swivel the movable platform to the closed position. This movement will be readily understood by comparing Figs. 4 and 5. It will be noted that the forward movement of the drawbar exerts a forward pull through chain 26 on the yoke member 25. This member transmits the motion through the lever system 24, 19, 18, and 16 to the king-pin 15, upon which the movable platform is mounted. As the king-pin 15 is turned, the movable platform is rotated to its closed position, at the same time spring lever 17 is caused to rotate counterclockwise so as to stress spring 29. The forward motion of the drawbar is also imparted through chain 26, connector 25, and cable 9 to the swivel mechanisms of the remaining cars in the train, and the movable platform of each of these cars is rotated to the closed or towing position in the manner just described.

In the last few inches of movement of the drawbar 11 the chain 36 of the brake mechanism is tightened and caused to move throughout its length. This movement of chain 36 is imparted to the operating lever 34 and through shaft 32 to the releasing lever 47. The releasing lever 47 is caused to turn in a clockwise direction against the force of spring 44, thereby lifting the brakeshoe from the main wheels of the first truck.

After the drawbar has moved through a predetermined distance sufficient to effect both the closing of the swivel platforms and the releasing of the brakes, the stops 52 will engage plates 50 mounted on the main frame 3 of the first trailer truck. With the stops engaged in this manner, all the force applied to the drawbar by the power unit will be transmitted directly to the truck frame and through the coupling devices 5 and 6 to the remaining cars in the train, thereby preventing any undue stressing of cable 9.

When the stop 52 engages the bracket 50 mounted on the truck frame 3, the slot 53 in the drawbar will be directly under the locking pawl 55, and this pawl will drop into the slot as shown in Fig. 7. By this arrangement, the drawbar is locked in the towing position and variations in the towing force due to traveling downgrade or turning corners will not cause movement of the drawbar with the consequent setting of the brakes and rotation of the swivel platforms.

It will now be assumed that the trailer train has been towed to the desired point and is to be unloaded. Under these conditions the train will be stopped and the towing eye 13 of the power unit will be lifted from the towing hook 12. With the towing eye removed from the towing hook, the trigger 60 will be caused to rotate counterclockwise about its pivot point 59 by the spring 62. This movement of the trigger will cause the releasing dog 57 to be rotated so as to lift the locking pawl 54 out of the slot in the drawbar. The drawbar is now free to move rearwardly under the action of movable or swivel platform biasing spring 29 which was stressed during the closing of the movable platform.

In the first few inches of this movement chain 36, connected to lever 34 on brake shaft 32, is slackened. This slackening of chain 36 permits the releasing lever 47 to be moved counterclockwise by lever 39 which is actuated by spring 44. The movement of lever 39 in response to the force exerted by biasing spring 44 causes the brakes on the first truck to be set.

During the remaining movement rearward of the drawbar, the movable platforms on each truck of the train are swung in unison to their open position through the action of the springs 25 on each car and the force exerted thereby on spring levers 16. With the platforms in the open position the train may be readily unloaded by means of the high lift power unit in a manner similar to that in which it was loaded.

While I have shown and described a particular embodiment of my invention, modifications thereof will be apparent to those skilled in the art. I do not, therefore, desire my invention to be limited to the particular construction shown and described, and I intend in the appended claims to cover all modifications within the spirit and scope of my invention.

What I claim as new and desire to secure by Letters Patent of the United States is:

1. A trailer truck comprising a frame supported by a plurality of wheels and having a fixed platform, a horizontally movable platform pivotally mounted on said fixed platform, a relatively movable drawbar, and means actuated in response to movement of said drawbar for horizontally pivoting said movable platform with respect to said frame.

2. A trailer truck comprising a frame supported by a plurality of wheels, a drawbar mounted in said frame and adapted to translate to a limited extent with respect to said frame, a movable platform supported by said frame, said movable platform being adapted to rotate with respect to said frame, and means responsive to the limited translation of said drawbar for rotating said movable platform.

3. A trailer truck comprising a frame supported by a pair of wheels and a pair of swivel casters, a movable platform supported by said frame and adapted to rotate in a horizontal plane with respect thereto, self-energizing brakes adapted to engage said wheels, a drawbar mounted in said frame and arranged for limited translation relative to said frame, and means responsive to the translation of said drawbar for rotating said platform and operating said brakes.

4. In a trailer truck, the combination of a frame, a pair of wheels supporting one end of said frame, a pair of swivel casters supporting the other end of said frame, a plate fixed to the upper side of said frame, rollers mounted in said plate and extending thereabove, a king-pin journaled in the longitudinal center of said plate in advance of said wheels, a movable platform mounted on said king-pin and resting on said rollers adapted to rotate with respect to said frame and said plate, a drawbar mounted in said frame and arranged to translate with respect thereto, means limiting the translation of said drawbar, and means responsive to the limited translation of said drawbar for rotating said platform whereby a swivel platform truck is provided which is adapted to be readily moved to an open position while being loaded or unloaded and to a closed position while being towed.

5. In combination with a trailer truck having a frame and supporting wheels, a rotatable platform, a movable drawbar, and means for rotating said platform in response to movement of said drawbar.

6. A trailer truck comprising a frame supported by a plurality of wheels, a movable platform supported by said frame and adapted to rotate in a horizontal plane with reference to said frame, a movable drawbar for said truck supported by said frame, means responsive to movement of said drawbar for rotating said movable platform, means restricting the movement of said drawbar to two positions one corresponding to the position of said drawbar when said trailer truck is being towed, the other corresponding to the position of said drawbar when said trailer truck is being loaded or unloaded, means cooperating with said drawbar for locking said drawbar in either of its two positions, and means for releasing said locking means.

7. A trailer truck comprising a frame having supporting wheels, brakes cooperating with certain of said wheels, a movable platform adapted to swing to an open position for loading and unloading and to a closed position for towing, a drawbar adapted to translate and having two limiting positions one corresponding to said open position of said platform and the other to said closed position of said platform, means responsive to movement of said drawbar between said two positions for operating said brakes and swinging said platform, means for locking said drawbar in either of its two limiting positions, and means for releasing said locking means.

8. A trailer truck having a support mounted on a plurality of wheels, a swiveling platform pivotally mounted on said support, a movable drawbar for said truck, and a mechanism for swiveling said platform to an open or closed position, said mechanism comprising a king-pin upon which said platform is mounted journaled in said support, a spring lever fixed on said king-pin, a spring connected to said spring lever and adjustably secured to said support, said spring adapted to bias said platform to its open position, a main lever fixed to said king-pin, an auxiliary lever pivotally mounted on said support, connecting links between said main and auxiliary levers, an operating lever connected to said auxiliary lever and pivotally mounted on said support, and means connecting said operating lever to said drawbar whereby movement of said drawbar causes swiveling of said platform through said lever system.

9. A trailer truck having a support mounted on a plurality of wheels, a swiveling platform pivotally mounted on said support, a movable drawbar for said truck, and a mechanism for swiveling said platform to an open or closed position, said mechanism comprising a king-pin upon which said platform is mounted journaled in said support, a spring lever fixed on said king-pin, a spring connected to said spring lever and adjustably secured in said support, said spring adapted to bias said platform to its open position, a main lever fixed to said king-pin, and means connecting said main lever to said drawbar whereby movement of said drawbar actuates said swiveling platform.

10. In a trailer truck having supporting wheels, a frame mounted on said wheels, a brake mechanism cooperating with at least one of said wheels, a swivel platform supported by said frame and adapted to swing to an open position and to a closed position, a mechanism for effecting the swiveling of said platform, a drawbar movably mounted in said frame and adapted for limited movement forward and backward with respect to said truck, means connecting said drawbar to said brake mechanism, and means connecting said drawbar to said swiveling mechanism so that when force is applied to said drawbar moving it forward said swiveling mechanism will be operated first to move said platform to said closed position and then the brake mechanism will be operated to release said wheel, and when force is removed the brake mechanism will be operated first to brake said wheel and the swiveling mechanism will be operated to move said platform to said open position.

11. A train of trailer trucks consisting of a plurality of trailer trucks coupled together, a drawbar movably mounted on one of said trucks, a movable platform on each of said trucks adapted to be swung to a loading and unloading position and to a towing position, and means responsive to movement of said drawbar for swinging said platforms to either of said positions.

12. In a trailer train consisting of a plurality of trailer trucks coupled together, a movable platform on each of said trailer trucks adapted to be swung to an open and a closed position, a movable drawbar attached to the first truck of said trailer train, and means responsive to movement of said drawbar for swinging the platform on each of said trucks.

13. In a trailer train consisting of a plurality of trailer trucks, coupling means interconnecting said trucks, a movable platform on each of said trailer trucks adapted to be swung to an open and a closed position, a drawbar supported in the frame of said first truck and adapted for limited movement with respect thereto, and means independent of said coupling means and actuated by movement of said drawbar for swinging the platform on all of the trailer trucks.

14. In a trailer train consisting of a first truck and a plurality of succeeding trucks, means coupling said trucks together, a movable platform on each of said trucks, mechanism on each truck for moving each platform, a movable drawbar on said first truck, means connected to said drawbar for actuating the mechanism on each truck and for moving said platforms in unison, said means being independent of said coupling means.

15. In a trailer train consisting of a plurality of trucks, means coupling said trucks together, a swiveling platform mounted on each truck, a swiveling mechanism mounted on each truck for swiveling said platform, a movable drawbar supported by one of said trucks, and means independent of said coupling means connecting said swiveling mechanisms to said drawbar whereby movement of said drawbar actuates the swiveling mechanism of each truck.

16. In a trailer train consisting of a plurality of trucks coupled together, a swiveling platform mounted on each of said trucks, a mechanism mounted on each of said trucks for swiveling each of said swiveling platforms, and means on one of said trucks for actuating said swiveling mechanisms.

17. In a trailer train consisting of a first truck and a plurality of succeeding trucks, means coupling said trucks together, a swiveling platform mounted on each truck, a swiveling mechanism mounted on each truck for actuating said swiveling platforms in unison.

18. A trailer truck train comprising a first truck, a plurality of succeeding trucks, a movable platform on each truck, a mechanism on each truck adapted to swivel said movable platform, a movable drawbar mounted on said first truck, means connecting said drawbar to the swiveling mechanism of each truck whereby movement of said drawbar actuates said swiveling mechanisms, and means on said drawbar cooperating with the frame of said first truck to limit the movement of said drawbar whereby, after limited movement of said drawbar in response to a towing force, the towing force is transmitted directly to said frame of said first truck and through said coupling means to the remaining trucks, thereby relieving the strain on said swivel mechanism actuating means.

19. In a trailer truck comprising a frame having supporting wheels, a movable platform mounted on said frame and adapted to swing to an open position for loading and unloading and to a closed position for towing, a self-energizing brake system for said truck having a braking and non-braking position, a drawbar supported on said frame and adapted to translate between two limiting positions, one of said positions corresponding to the open position of said platform and the braking position of said brake system and the other of said positions corresponding to the closed position of said platform and the non-braking position of said brake system, and means connecting said platform and said brake system to said drawbar so that upon forward movement of said drawbar said platform is swung to its closed position and then said brake system moves to a non-braking position and upon rearward movement of said drawbar said brake system moves to the braking position and then said platform is rotated to said open position.

20. A trailer truck comprising a frame supported by a plurality of wheels, a movable platform supported by said frame and adapted to rotate in a horizontal plane with reference to said frame, a movable drawbar for said truck supported by said frame, a towing hook at one end of said drawbar, means responsive to movement of said drawbar for rotating said movable platform, means for confining the movement of said drawbar between two limiting positions, means for locking said drawbar in either of said two positions, and means movably mounted on said towing hook for releasing the locking means.

21. A trailer truck comprising a frame supported by a plurality of wheels, a movable platform supported by said frame and adapted to rotate in a horizontal plane with reference thereto, a movable drawbar for said truck supported by said frame, means responsive to translation of said drawbar for rotating said movable platform, means for limiting the translation of said drawbar between a towing and a non-towing position, a towing hook at one end of said drawbar, means comprising a slot in said drawbar and locking pawls mounted on said frame for locking said drawbar in either said towing or said non-towing position, means for releasing said locking means, and trigger means movably mounted on said towing hook and adapted to be actuated by movement of a towing eye into said towing hook for actuating said releasing means.

22. A trailer truck comprising a frame supported by a plurality of wheels, a movable platform supported by said frame and adapted to rotate in a horizontal plane with reference to said frame, a movable drawbar for said truck supported by said frame, means responsive to movement of said drawbar for rotating the movable platform, a towing hook at one end of said drawbar, a trigger pivoted on said towing hook and adapted to be operated by movement of a towing eye into said towing hook, means comprising a slot in said drawbar and a pair of locking pawls mounted on said frame for locking said drawbar in either a towing or a non-towing position, a releasing dog for releasing said locking pawls, and means for connecting said dog to said trigger so that the drawbar is locked in the non-towing position by one of said locking pawls until said towing hook is positively engaged by a towing eye and is locked in the towing position by the other of said locking pawls until the towing hook is positively disengaged from said towing eye.

WILLIAM G. UHLIR.